Aug. 2, 1966  E. F. DOSIE ETAL  3,263,358
COMBINATION LICENSE PLATE FRAME AND HOLDER
Filed March 9, 1964
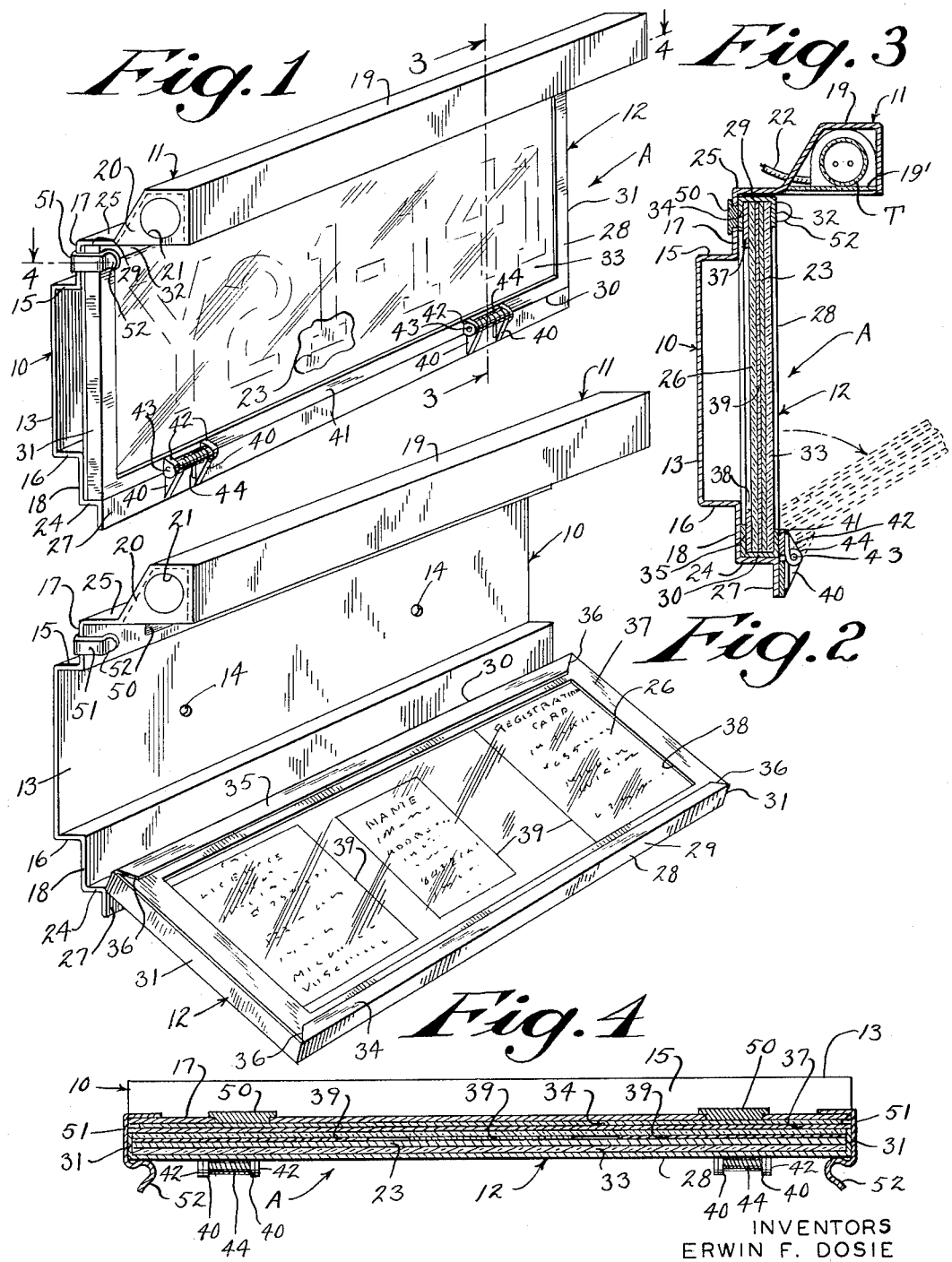
INVENTORS
ERWIN F. DOSIE
BERNARD J. GOLATKA
BY
George W. Wright, Jr.

United States Patent Office 3,263,358
Patented August 2, 1966

3,263,358
COMBINATION LICENSE PLATE FRAME
AND HOLDER
Erwin F. Dosie and Bernard J. Golatka, Milwaukee, Wis., assignors of one-fourth each to Clarence E. Hessenthaler and Edwin C. Griffa, both of Milwaukee, Wis.
Filed Mar. 9, 1964, Ser. No. 350,390
5 Claims. (Cl. 40—209)

This invention appertains to card, picture and sign exhibiting and more particularly to new and useful improvements in a combination illuminated automotive license plate frame and pivoted holder for important identification instruments and papers, as well as for exhibiting the plate with a high degree of visibility.

In the past, there have been developed various types of holders for license plates and types of illumination of the plates, for night driving. There is a need, however, for a license plate holder wherein the plate can be easily placed in the holder and removed therefrom and which can be readily attached to the automotive vehicle in such a manner as to facilitate the changing of the plate and so that the entire plate will be illuminated to greatly increase the visibility of the same.

Further, it often becomes necessary to properly identify the vehicle by the presentation of a registration card, and it would be advantageous to be able to quickly and readily identify the owner and driver of the vehicle, and very advantageous to have this information available in the same place or holder wherein the plate is exhibited. In this way, the proper identification of both vehicle and owner would always be available with the car. While license plates are illuminated at night and such illumination is often required by law, to our knowledge this past illumination means has been inadequate.

It is, therefore, a primary object of the present invention to provide a new and useful combination license plate frame and pivoted holder for the plate to be exhibited and wherein the important identifying papers are carried by the pivoted holder and readily accessible for observation.

Another important object of the present invention is to provide a license plate frame and pivoted holder wherein the manner of illuminating the plate is greatly improved by utilizing black light and by correspondingly coating the plate with paint responsive to the black light.

A further object of our present invention is to provide a pivoted holder for exhibiting the license plate and carrying the important identification papers, which in one position will exhibit the license plate in clear view and which can be readily pivoted to exhibit the important papers on the other side of the holder.

A still further object of the present invention is to provide a novel means for firmly holding the combination pivoted license plate holder in its operative position wherein the license plate is in full view.

A salient feature of the present invention resides in providing a combination plate frame and pivoted holder that can be quickly and readily secured to the automotive vehicle carrying a pivoted holder in the nature of an open frame carrying transparent panels on both front and rear of the frame between which is carried the license plate and important identifying papers in a novel manner and wherein the entire pivoted holder is so constructed and arranged that the identifying papers as well as the license plate can be readily removed from and placed in the holder, the frame per se carrying means for a longitudinally extending black light placed in such a manner that the entire license plate will be illuminated to greatly enhance the visibility particularly at night.

A still further object of the present invention is to provide a simple, practical and reliable construction that is economical to manufacture, easy to assemble and positive in its operation.

With the above and other objects in view, which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which, FIGURE 1 is a front elevational view in perspective showing the new and improved combination illuminated automotive license frame and pivoted holder with the holder being in its closed vertical position to exhibit the license plate;

FIGURE 2 is a front elevational view in perspective similar to FIGURE 1 of the drawings but showing the pivoted holder in its open position for viewing the important identifying instruments or papers;

FIGURE 3 is a vertical transverse section taken through the device, the section being taken on the line 3—3 of FIGURE 1, looking in the direction of the arrows, and illustrating how the pivoted holder can be moved from its full line license plate exhibiting position to its dotted line open position, and FIGURE 4 is a longitudinal horizontal section through the entire device, the section being represented by the line 4—4 of FIGURE 1 of the drawings, looking in the direction of the arrows and illustrating in particular the sequential arrangement of the various members held in the pivoted holder and its relation to the supporting frame.

Referring now to the drawings in detail, wherein similar reference characters designate corresponding parts throughout the several views, the letter A generally indicates the combination illuminated automotive license plate frame and pivoted holder, and the same includes broadly a supporting frame 10 adapted to be secured to the automotive vehicle carrying the black light assembly 11 and the pivoted holder 12. The supporting frame 10 can be made of any desired material but preferably is stamped from a single sheet of metal of the desired gauge. Thus, the frame 10 includes a rear supporting panel 13, which is provided with the necessary apertures 14 to secure the panel and frame to the rear of an automotive vehicle. Obviously, the frame could be attached to either the front or rear of the vehicle; for practical purposes however, the device is primarily designed to be attached to the rear of the vehicle. In any event, the supporting panel 13 also carries horizontally disposed top and bottom walls 15 and 16, and at the end terminations of the horizontally disposed top and bottom walls 15 and 16 we provide the vertically extending walls 17 and 18 respectively. These walls are of a size and configuration to correspond to the size of the pivoted holder 12. Secured to the upper vertical wall 17 is the forwardly extending frame 19 for the black light assembly 11 and it is highly desirable that this frame 11 be formed as illustrated to include the end walls 20 and the end walls are in turn provided with suitable apertures 21 of a size and configuration to receive the illuminated tube T for the black light. It should be noted that there is also provided a glass or plastic guard shield 19' to protect the light from dust and dirt. Obviously, suitable connections and wires 22 are provided to connect the black light tube with a source of electrical energy. The black light assembly 11 and its frame 19 should be so constructed and arranged that the light is forward of and just above the license plate 23, and that it extends the entire length of the plate. Thus, when the plate is painted or coated with a material that responds to the black light, the plate will stand out in such a manner that it can be readily and easily viewed. This greatly overcomes the objection to the small lights now utilized above the license plates, and which only half illuminate the plates, and even when properly illuminating the plates, the ordinary numerals and letter used on the plates are not readily visible. In fact, this use of material that responds to black light acts as an additional safety feature, in that, should the car be incapacitated and parked along the highway, the rays from ordinary light beams from oncoming vehicles will reflect upon the material, and thus call attention to the stalled vehicle. The lower vertically extending wall 18 also carries a horizontally disposed wall 24 which is parallel to the portion 25 of the black light assembly. Thus, vertical walls 17, 18 and horizontal walls 24, 25 provide a frame to receive and support the pivoted holder 12, particularly in its closed position. Top and bottom walls 15 and 16 act to space the inner portion of the holder 12 from the frame supporting panel 13. This arrangement performs two useful functions, one being that the attaching members (not shown) associated with apertures 14, will not interfere with the proper closing of the pivoted holder 12, and the other, that frost will not accumulate on the inner transparent sheet 26 due to the fact that there is sufficient air circulation between the panel 13 and the rear or inner face of the pivoted holder 12.

Depending from the horizontally disposed wall 24 is the longitudinally extending lip 27. The pivoted holder 12 includes broadly a substantially rectangular shaped frame 28 of a size and configuration to fit within the confines of the walls 17, 18, 24 and 25 and therefore includes upper and lower walls 29 and 30, respectively and the end walls 31. Integral with the walls 29, 30 and 31 at the forward end of the holder is the inwardly extending peripheral flange 32 and thus it can be seen that the holder 12 is formed in the nature of a picture frame or the like and flange 32 acts as a support for the outer transparent sheet 33. The opening defined by the peripheral flange 32 should be large enough to accommodate a conventional license plate, as previously indicated by the reference numeral 23 in such a manner that the same can be viewed through the transparent sheet 33. The inner or rear portion of the holder 12 is entirely open except for the provision of an upper longitudinally extending lip 34 and a corresponding lower lip 35. Thus, end walls 31 are not provided with lips or flanges and therefore material can be slipped between the formed end terminations 36 of the flanges 34 and 35 and the transparent panels, license plates, identifying instruments and the like can be easily and readily placed in the holder, as well as removed therefrom. However, in order to firmly hold the various stacked elements within the holder, we do provide a backing mat 37 having a large central open portion 38 to allow the free viewing of the various papers held therein. Thus, to properly utilize the holder 12, the transparent sheet 33 is first placed in the holder, in back of this sheet the license plate 23 with the proper numerals facing out, is placed, and in back of the license plate we place the various important identifying papers 39, then the inner transparent sheet 26 is placed over the papers 39 and the backing material or mat 37, and the entire assembly is firmly held within the holder 12 by means of the peripheral flange 32 and the rear lips 34 and 35. The holder 12 is preferably pivoted to the frame 10, and this may be accomplished in any desired manner, but in the preferred form we attach a pair of spaced U-shaped brackets 40 welded or otherwise secured to the depending lip 27. Adjacent the brackets 40 and on the lower portion 41 of the peripheral flange 32, we mount correspondingly shaped U-brackets 42 and these brackets overlap to carry the pivot pins 43 for springs 44 and these springs are so constructed and arranged that they are biased to hold the pivoted member in its closed license plate exhibiting position as shown primarily in FIGURE 1 of the drawings, and thus when the pivoted holder 12 is moved from the full line position, FIGURE 3, toward the dotted line position, it is against the tension and biasing of the springs. While under most circumstances, the springs alone would be sufficient to hold the member 12 in its closed position, due to the nature of the invention i.e., its association with an automotive vehicle, the frame may be subjected to unusual jarring and therefore additional means is provided to firmly secure the pivoted holder 12 in its operative license plate exhibiting position.

In one form, this additional holding means includes a pair of permanent magnets 50 which are set in the vertically extending wall 17. These magnets also assure the full setting of the holder in the frame member since as the holder approaches the vertical position, the magnets will exert a force which will pull or snap the holder into position. We may also provide a pair of spring fingers 51 each secured to the wall 17 and projecting forwardly about the holder 12. Thus the holder is firmly held in its operative position and when it is necessary to exhibit the important identification papers 39, the spring fingers can be spread by means of the fingerpiece 52 to release the holder and the holder can be then pivoted away from the magnets toward the dotted line position FIGURE 3, and its position as illustrated in FIGURE 2.

From the foregoing, it can be seen that we have provided a novel combination license plate frame and pivoted holder which not only assures the easy viewing of the license plate either by night or day, but provides means whereby the more important identification papers, and particularly driver identification papers, can be readily held and viewed by authorized persons.

While we have shown and described certain specific embodiments of the invention, it will be understood that these embodiments are merely for the purpose of illustration and description, that various other forms may be devised and that changes may be made in the proportions and minor details of construction without departing from the spirit of the invention or scope of the appended claims.

We claim:

1. A combination license plate frame and holder comprising, a frame member of a size and configuration to be secured to an automotive vehicle, a substantially rectangularly shaped holder, means pivotally securing the holder to said frame, said holder being open front and rear, a pair of spaced transparent panels held in said holder, a license plate and identification material positioned between said panels, said license plate exhibited through one of said panels, and the identification material viewable through the other of said panels, and means for removably holding said material in said holder, said holder being so constructed and arranged to be pivoted to a vertical position for exhibiting the license plate, and pivotally moved to a substantially horizontal position to exhibit said identification material.

2. A combination license plate frame and holder as set forth in claim 1, wherein a rear wall of said frame is spaced a substantial distance from said holder when said holder is in its vertical license plate exhibiting position.

3. A combination license plate frame and holder as set forth in claim 1, wherein said frame includes a forwardly projecting wall adjacent the top portion of said frame, a longitudinally extending light assembly carried by said projecting wall, and said light assembly extending the entire length of the frame and holder.

4. A combination license plate frame and holder as set forth in claim 3, wherein said light assembly includes a black light, said license plate being coated with a material activated by said black light.

5. A combination license plate frame and holder as set forth in claim 1, wherein said holder is firmly held in its vertical license plate exhibiting position by means of a pair of magnets carried by said frame, and a pair of spring clips secured to said frame and adapted to snap over said holder.

References Cited by the Examiner

UNITED STATES PATENTS

| 1,221,277 | 4/1917 | Bostock | 40—134 |
| 1,471,337 | 10/1923 | Johnson | 40—205 |
| 1,816,289 | 7/1931 | Kleinsmith | 40—200 |
| 1,887,087 | 11/1932 | Frizner | 40—204 |

FOREIGN PATENTS

| 930,799 | 7/1963 | Great Britain. |

EUGENE R. CAPOZIO, *Primary Examiner.*